United States Patent [19]

De Vale

[11] 4,006,752
[45] Feb. 8, 1977

[54] CONTROL FOR FLUID FLOW SYSTEM
[75] Inventor: Donald P. De Vale, Sycamore, Ill.
[73] Assignee: Everpure, Inc., Westmont, Ill.
[22] Filed: Oct. 24, 1975
[21] Appl. No.: 625,535
[52] U.S. Cl. .......................... 137/101.21; 73/DIG. 3
[51] Int. Cl.² ...................................... G05D 11/00
[58] Field of Search .......... 137/98, 101.19, 101.21, 137/3, 88; 73/DIG. 3, 195, 196

[56] References Cited
UNITED STATES PATENTS

| | | | |
|---|---|---|---|
| 3,096,779 | 7/1963 | Kraft et al. | 137/101.19 |
| 3,219,046 | 11/1965 | Waugh | 137/101.19 X |
| 3,229,077 | 1/1966 | Gross | 137/101.19 X |
| 3,259,141 | 7/1966 | Brendon | 137/3 |
| 3,636,767 | 1/1972 | Duffy | 73/DIG. 3 |

Primary Examiner—William R. Cline
Attorney, Agent, or Firm—Hill, Gross, Simpson, Van Santen, Steadman, Chiara & Simpson

[57] ABSTRACT

A fluid flow system including automatic feeder control for supplying chemicals to fluid flowing through a conduit and utilizing a Hall Effect detector which supplies an output to a digital counter which feeds a comparator that operates a timer and electronic switch to control the chemical feeder.

7 Claims, 2 Drawing Figures

CONTROL FOR FLUID FLOW SYSTEM

BACKGROUND OF THE INVENTION

1. Field of the Invention

This invention relates in general to fluid flow systems using magnetically coupled meters and chemical feeder devices and in particular to an improved electronically controlled chemical feeder device.

2. Description of the Prior Art

It is necessary at times to accurately add chemicals or other substance to fluid flowing through a conduit and there are currently available mechanical systems which utilize gear trains and external time delay relays for adding the chemical or other substance to the fluid.

SUMMARY OF THE INVENTION

The present invention relates to an improved fluid flow system for controlling the addition of chemicals to the fluid which provides a very compact and reliable system.

The fluid flowing through the conduit drives a magnet so that it rotates at a speed proportional to the velocity of the fluid and the speed of rotation of the magnet is detected by a Hall Effect device which produces pulses that are fed to a digital counter. The digital counter supplies an output to a comparator which can be preset to a selected number of pulses and the comparator has a change of state when the number of pulses received from the counter equals the preset level of the comparator. The comparator drives a reset terminal of the digital counter through a delay device and an inverter and also controls a timer which is connected to an electronic switch that turns on the feeder for supplying chemicals or other substance to the fluid in the conduit. By changing the setting of the comparator the concentration of the chemical or other substance in the fluid in the conduit can be controlled.

BRIEF DESCRIPTION OF THE DRAWINGS

Other objects, features and advantages of the invention, will be readily apparent from the following description of certain preferred embodiments thereof taken in conjunction with the accompanying drawings although variations and modifications may be effected without department from the spirit and scope of the novel concepts of the disclosure, and in which.

DESCRIPTION OF THE PREFERRED EMBODIMENTS

Figure 1:
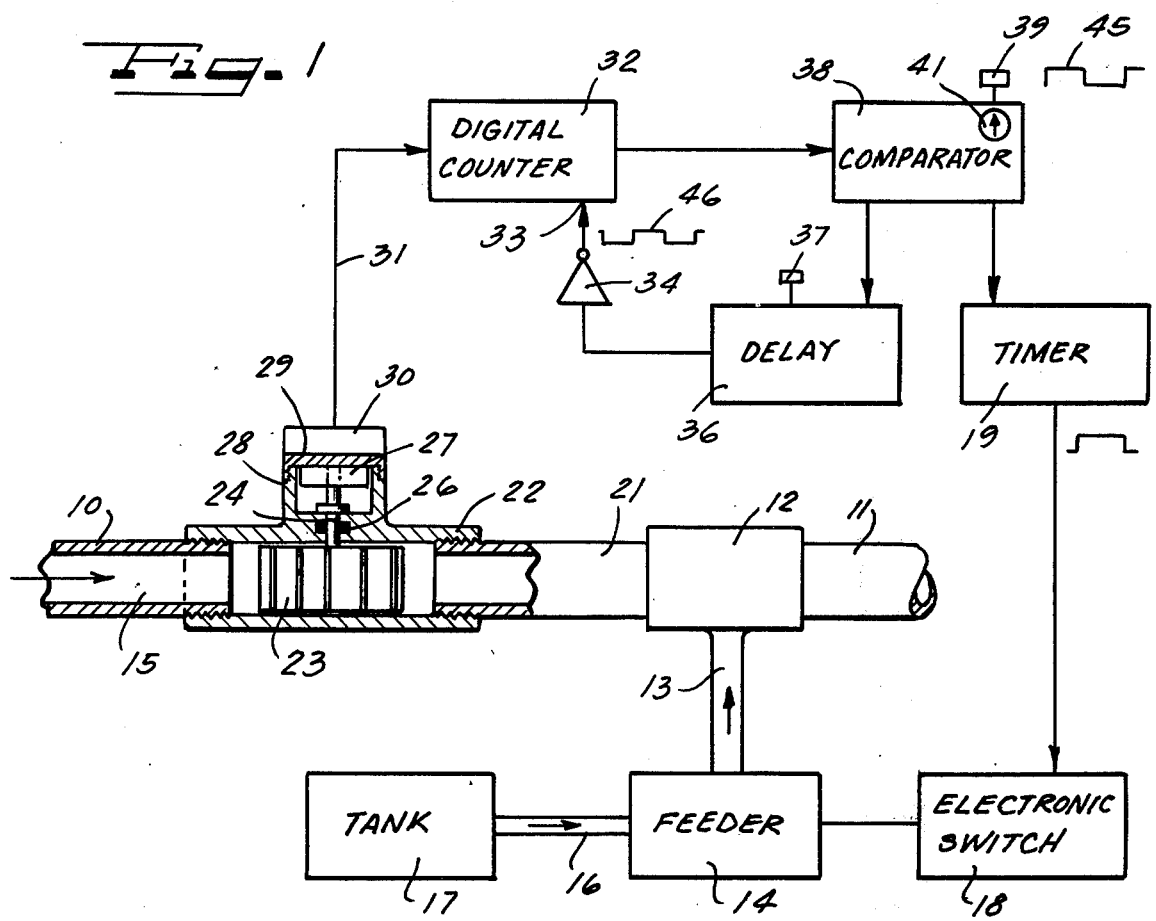
FIG. 1 is a block diagram of the invention.

FIG. 1 illustrates an input conduit 10 in which fluid 15 is flowing and an output conduit 11 in which the fluid has had a chemical or other substance added by the system of the invention. A conduit 22 joins the inlet conduit 10 and an intermediate conduit 21 and carries a propeller 23 which is supported by suitable bearings 26 on a shaft 24 such that the propeller 23 rotates at a speed depending upon the velocity of the fluid 15 through the conduit 10. A permanent magnet 27 is carried in a housing 28 connected to the conduit 22 and is mounted on the shaft 24 such that it rotates with the propeller 23. A Hall Effect device 30 is mounted on the top 29 of the housing 28 and produces output pulses as the magnet 27 rotates when driven by the propeller 23. Conductor 31 supplies the output of the Hall device 30 to a digital counter 32 which counts the output pulses of the Hall Effect device 30. The counter 32 supplies an input to a comparator 38 which compares the output of the counter 32 with a preset count set by a knob 39 and indicated on a dial 41 of the comparator. The output of the comparator 38 changes state when the number of revolutions as counted by the digital counter 32 equals the preset number in the comparator 38. The comparator 38 provides two outputs when it changes condition from the high to the low state. One of the outputs is supplied to a timer 19 which is connected to an electronic switch 18 to control a valve-feeder 14 which is connected by conduit 13 to the conduit 12 through which the fluid 15 flows so as to supply chemical or other material from a tank 17 and a conduit 16 to the fluid 15.

Figure 2:
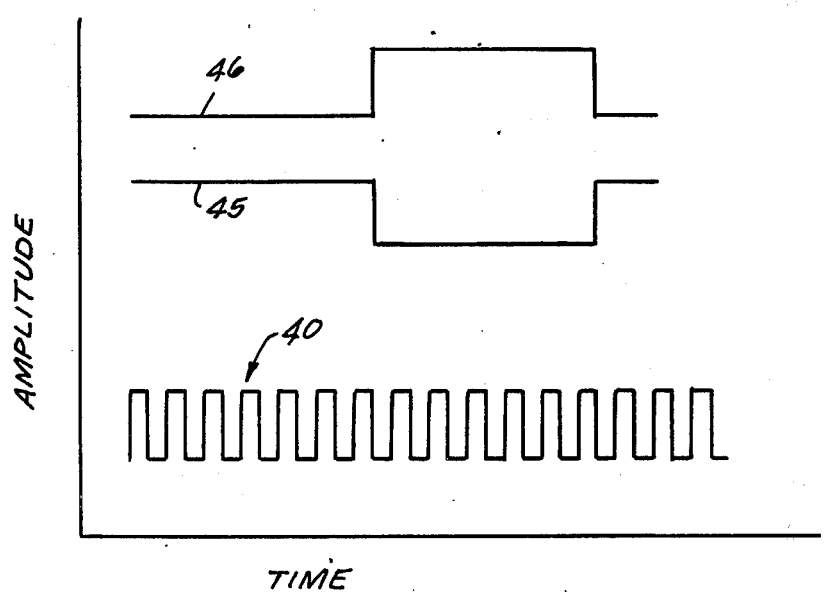
FIG. 2 illustrates wave forms which exist in the system of the invention.

In operation fluid 15 flowing through the conduit 22 rotates the propeller 23 and drives the magnet 27 which induces output pulses in the Hall Effect device 30 which are supplied to the digital counter 32. When the propeller 23 has turned a number of revolutions to produce output pulses from the counter 32 which equal the setting of the comparator 38 the output of the comparator 38 will change from a high condition to a low condition as illustrated by wave shape 45 in FIG. 2. The output pulses of the Hall device are shown by pulse train 40 in FIG. 2. When the output of the comparator 38 changes to the low state the timer 19 is energized which immediately energizes the electronic switch 18 to open the valve 14 so that chemical or other material from the tank 17 will be added to the fluid 15.

The amount of chemical or other material added to the fluid 15 depends both on the length time that the valve 14 is open by the electronic switch 18 and timer 19 as well as the number set by the knob 39 in the comparator 38. If a smaller number is set by the knob 39 in the comparator 38 the timer 19 will be actuated more often since the quantity of fluid flow is directly proportional to the number of rotations of the magnet 27.

The second function of the comparator 38 is to reset the digital counter 32 and when the output of counter 32 matches the pre-programmed input to the comparator 38 the output 45 of the comparator will go to the low state. This low signal is supplied through the time delay device 36 and the inverter 34 to the reset terminal 33 of the counter 32 to reset the counter. A high signal at terminal 33 resets the counter 32 to zero. The counter then immediately starts supplying an output to the comparator 38 and since the output of the counter does not match the preset input to the comparator the condition of the comparator reverts to the high state. This applies a low state to the reset terminal 33 of the counter allowing it to commence counting.

The following logic applies to the counter 32:
1. Reset low — will count pulses
2. Reset high — resets to zero output — will not count pulses but stays at zero even if pulsed.

In short, the sequence of operation of this chain is:
1. Counter at zero comparator not matched — output high inverter output low — reset at counter low counter ready to count pulses
2. Pulses start
3. a. counter output equals comparator preset
   b. comparator output falls to low
   c. inverter output goes to high
   d. counter reset input goes to high e. counter output reset to zero
f. counter output does not match comparator
g. comparator output goes to high
h. inverter output falls to low
i. counter ready to resume counting pulses Wave shape 46 illustrates the output of inverter 34.

The procedure described in step 3 might take less than one microsecond to complete and the comparator output remains in the low state for only one-half of that time. The width of this pulse is not sufficient to allow the timer 19 to function properly and the function of the time delay 36 which can be adjusted by the knob 37 is to delay the reset pulse to the reset terminal 33 of the counter for a time long enough to properly actuate the timer 19.

Let it be assumed that the timer 19 is set to actuate the electronic switch and the feeder valve 14 for a fixed time T. It is possible for the fluid flow to be fast enough to cause another change of state from the comparator 38 due to the fact that the counter has again counted the required number of pulses. In the present invention the timer 19 will be automatically reset without turning off the feed valve 14 and proceeds to again attempt to time out in a time duration T. As long as the frequency of the output pulses from the comparator 38 exceeds 1/T the timer 19 will never time out and the feeder valve 14 will be continuously opened supplying chemical or other material to the fluid 15. If the timer 19 were not reset output pulses from the Hall Effect device 30 would be missed and as the output of the comparator 38 has a frequency which exceeds 1/T the output of the feeder valve 14 would decrease.

The present invention provides a simple and accurate method of adding material to fluid and other substances and although it has been described with respect to preferred embodiments it is not to be so limited as changes and modifications can be made which are within the full intended scope as defined by the appended claims.

I claim:

1. Apparatus for supplying an additive to a fluid flowing in a pipe comprising a magnet rotatably supported and driven by said fluid such that it rotates at a speed proportional to the velocity of the fluid, a Hall effect device mounted adjacent said magnet and producing output pulses in response to rotation of the magnet, a digital counter receiving the output of said Hall effect device and counting said output pulses, a comparator having a preset count receiving the output of said counter and having two different output states corresponding to the conditions when said comparator has received less pulses from said counter than said preset count and pulses equal to said present count, a timer receiving an output of said comparator, an electronic switch receiving the output of said timer, a feeder connected to said pipe and receiving an output of said electronic switch and controlled by said comparator to turn the feeder off and on in response to said two states of said comparator, and a container connected to said feeder to supply an additive to said fluid when said feeder is on, and wherein said counter has a reset terminal and said comparator supplies an output to said reset terminal.

2. Apparatus according to claim 1, including a time delay connected between said reset terminal and said comparator.

3. Apparatus according to claim 2 including an inverter connected between said reset terminal and said comparator.

4. Apparatus according to claim 2 wherein said timer actuates said feeder for a fixed time and said timer is reset to zero time and starts to time out again each time an input is received from said comparator.

5. Apparatus according to claim 4 wherein said time delay has a delay sufficient to allow the timer to be properly actuated.

6. Apparatus according to claim 1 wherein said magnet is rotatably supported on a shaft and a propeller is mounted on said shaft and supported within said fluid to drive said magnet.

7. Apparatus according to claim 6 wherein said magnet is not supported in said fluid.

* * * * *